United States Patent

Alwafaie et al.

[11] Patent Number: 5,332,152
[45] Date of Patent: Jul. 26, 1994

[54] SANDS CARPET

[76] Inventors: Mohammed G. Alwafaie, P.O. Box 3854, Alkhobar 31952, Saudi Arabia; George Spector, 233 Broadway Rm 702, New York, N.Y. 10279

[21] Appl. No.: 79,398
[22] Filed: Jun. 21, 1993
[51] Int. Cl.⁵ .................. E01B 23/00; B60C 27/00
[52] U.S. Cl. ........................... 238/14; 152/208
[58] Field of Search ............. 238/10 R, 14; 152/208, 152/213 R, 216

[56] References Cited

U.S. PATENT DOCUMENTS

| | | | |
|---|---|---|---|
| 986,099 | 3/1911 | Sprung | 238/14 |
| 1,606,622 | 11/1926 | Fogarty | 238/14 |
| 1,617,271 | 2/1927 | Penfield | 238/14 |
| 2,058,192 | 10/1936 | Turulis | 238/14 |
| 3,323,572 | 6/1967 | Farah | 152/208 |
| 3,580,317 | 5/1971 | McHargue | 238/14 X |
| 3,630,440 | 12/1971 | Sams | 238/14 |
| 4,133,480 | 1/1979 | Granryd | 238/14 |
| 4,993,768 | 2/1991 | Ewen | 238/14 X |
| 5,100,054 | 3/1992 | Fickett et al. | 152/208 X |
| 5,236,026 | 8/1993 | Springer | 152/213 R X |

FOREIGN PATENT DOCUMENTS 2087320 5/1982 United Kingdom ............ 238/14

Primary Examiner—Michael S. Huppert
Assistant Examiner—Scott L. Lowe

[57] ABSTRACT

A traction mat is provided for use under a wheel of a motor vehicle on a soft sand terrain which consists of a generally rectangular housing having a plurality of spaced apart treads. A pair of wires extend from one end of the housing and are connected to two lug nuts on the wheel. When the wheel is driven slowly the housing will go under the wheel with the threads providing traction.

3 Claims, 1 Drawing Sheet

1

SANDS CARPET

BACKGROUND OF THE INVENTION

The instant invention relates generally to wheel traction assistance structures and more specifically it relates to a traction mat, which provides excellent traction features for a soft sand terrain, There are available various conventional wheel traction assistance structures which do not provide the novel improvements of the invention herein disclosed.

SUMMARY OF THE INVENTION

A primary object of the present invention is to provide a traction mat that will overcome the shortcomings of the prior art devices.

Another object is to provide a traction mat for use under a wheel of a motor vehicle in an emergency situation, such as for a soft sand terrain.

An additional object is to provide a traction mat that can be rolled into a very compact bundle for storage and can be unrolled for use as a relatively rigid tread-like platform with excellent traction features.

A further object is to provide a traction mat that is simple and easy to use.

A still further object is to provide a traction mat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
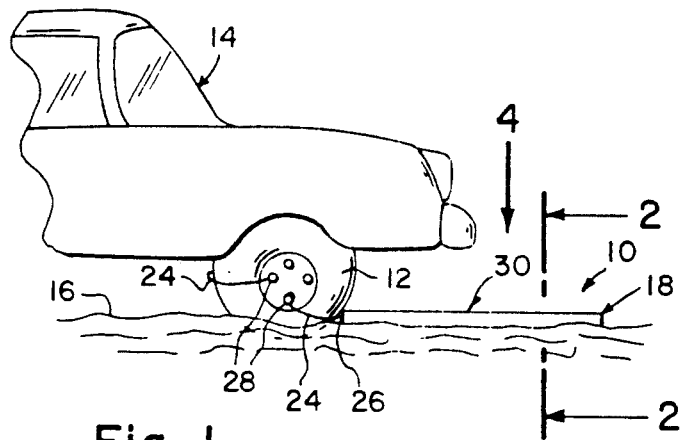
FIG. 1 is a side view of the instant invention in use.
Figure 2:
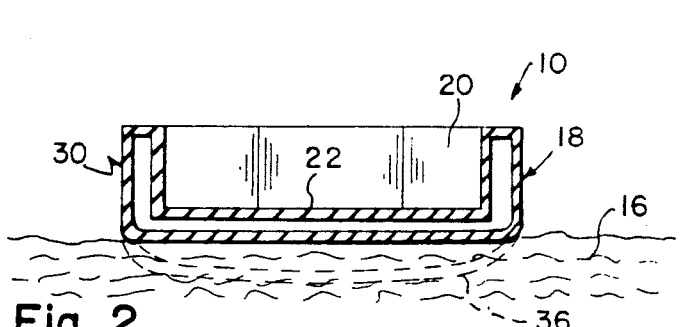
FIG. 2 is a cross sectional view taken along line 2—2 in FIG. 1.
Figure 3:
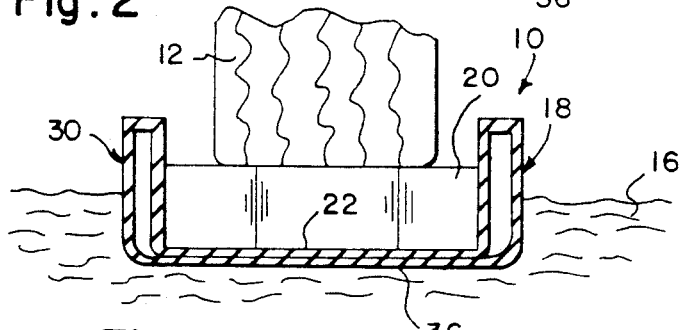
FIG. 3 is a cross sectional view similar to FIG. 2 with the wheel on the tread.
Figure 4:
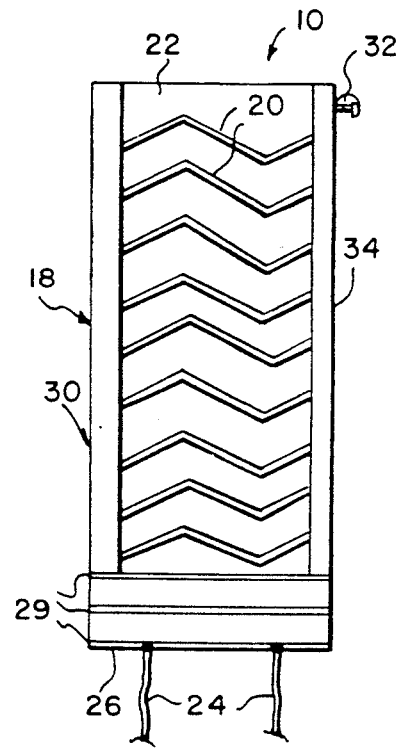
FIG. 4 is a top plan view taken in direction of arrow 4 in FIG. 1.

Turning now descriptively to the drawings, in which similar reference characters denote similar elements throughout the several views, FIGS. 1 through 4 illustrate a traction mat 10 for use under a wheel 12 of a motor vehicle 14 on a soft sand terrain 16, which consists of a generally rectangular housing 18 placed upon the soft sand terrain 16. A plurality of spaced apart treads 20 are on a top surface 22 of the housing 18, so that the wheel 12 can ride thereupon. A pair of wires 24 extend from one end 26 of the housing 18 and is connected to two lug nuts 28 on the wheel 12. When the wheel 12 is driven slowly, the housing 18 will go under the wheel 12 with the treads 20 providing traction for wheel 12. A plurality of reinforcement rods 29 are transversely spaced apart at the one end 26 of the housing 18, having the wires 24 extending therefrom to strengthen the housing 18.

The housing 18 has a stretchable hollow body 30 and is U-shaped in cross section. An air valve 32 is connected to one side 34 of the body 30 to be air inflated, so that a bottom surface 36 of the body 30 can press into the soft sand terrain 16 for a better grip.

Figure 6:
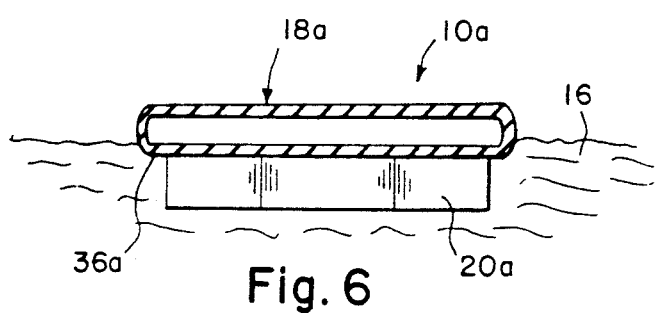
FIG. 6 is a cross sectional view taken along line 6—6 in FIG. 5, showing one of the treads digging into the soft sand.
Figure 5:
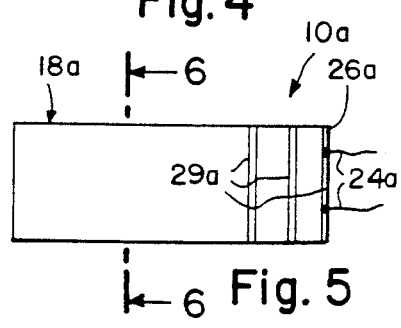
FIG. 5 is a top plan view of a modification whereby the treads are on the underside.

FIGS. 5 and 6 show a modified traction mat 10a for use under the wheel 12 of the motor vehicle 14 on the soft sand terrain 16, which contains a generally rectangular inflatable housing 18a. A plurality of spaced apart treads 20a are on a bottom surface 36a of the housing 18a. When the wheel 12 rides upon the housing 18a, the treads 20a will be forced into the soft sand terrain 16. A plurality of reinforcement rods 29a are also transversely spaced apart at one end 26a of the housing 18a to strengthen the housing 18a thereat. A pair of wires 24a extend from the reinforced end 26a of the housing 18a and is connected to the two lug nuts 28 on the wheel 12. When the wheel 12 is driven slowly, the housing 18a will go under the wheel 12 with the treads 20a providing traction into the soft sand terrain 16.

The traction mat 10 and 10a is made from a very strong and thin rubber material. It will take up a small area when rolled up and not be very heavy, so that it can be stored conveniently. The wires 24 and 24a can be separated from the traction mat 10 and 10a, so that it also can be utilized as an air mattress bed.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A traction mat for use under a wheel of a motor vehicle on a soft sand terrain which comprises:
    a) a generally rectangular hollow housing with means for inflation placed upon the soft sand terrain;
    b) a plurality of spaced apart treads on a top surface of said housing, so that said wheel can ride thereupon; and
    c) a pair of wires extending from one end of said housing and connected to two lug nuts on said wheel, so that when said wheel is driven slowly said housing will go under said wheel with said treads providing traction for said wheel.

2. A traction mat as recited in claim 1, further including a plurality of reinforcement rods transversely spaced apart at said one end of said hosing having said wires extending therefrom to strengthen said housing; further including:
    a) said housing having a stretchable hollow body and being U-shaped in cross section; and
    b) an air valve connected to one side of said body to be air inflated, so that said body can press into the soft sand terrain for a better grip.

3. A traction mat for use under a wheel of a motor vehicle on a soft sand terrain which comprises:
    a) a generally rectangular inflatable housing;
    b) a plurality of spaced apart treads on a bottom surface of said housing, so that when said wheel rides upon said housing said treads will be forced into the soft sand terrain;

c) a plurality of reinforcement rods transversely spaced apart at a reinforced end of said housing to strengthen said housing; and
d) a pair of wires extending from said reinforced end of said housing and connected to two lug nuts on said wheel so that when said wheel is driven slowly said housing will go under said wheel with said treads providing traction into the soft sand terrain.

* * * * *